United States Patent
Coburn, IV

(10) Patent No.: US 11,758,199 B2
(45) Date of Patent: *Sep. 12, 2023

(54) GROUPED ZONES IN A SYSTEM WITH MULTIPLE MEDIA PLAYBACK PROTOCOLS

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,004

(22) Filed: Jul. 26, 2021

(65) Prior Publication Data

US 2022/0053223 A1 Feb. 17, 2022

Related U.S. Application Data

(63) Continuation of application No. 15/714,927, filed on Sep. 25, 2017, now Pat. No. 11,076,177.

(Continued)

(51) Int. Cl.
*H04N 21/218* (2011.01)
*H04L 69/18* (2022.01)
(Continued)

(52) U.S. Cl.
CPC ....... *H04N 21/21805* (2013.01); *G06F 3/165* (2013.01); *H04L 12/1822* (2013.01);
(Continued)

(58) Field of Classification Search
CPC ......... H04N 21/21805; H04N 21/2181; H04N 21/2381; H04N 21/2668; H04N 21/4307;
(Continued)

(56) References Cited

U.S. PATENT DOCUMENTS 5,440,644 A 8/1995 Farinelli et al.
5,586,335 A 12/1996 Utan
(Continued)

FOREIGN PATENT DOCUMENTS

EP 1389853 A1 2/2004
JP 2015518325 A 6/2015
(Continued)

OTHER PUBLICATIONS

Advisory Action dated Feb. 13, 2020, issued in connection with U.S. Appl. No. 15/714,927, filed Sep. 25, 2017, 4 pages.
(Continued)

*Primary Examiner* — Michael Won

(57) ABSTRACT

A first networked device may perform operations including receiving, from a media source device, a media stream. The first networked device may be configured to use a first media playback protocol and the media source device may be configured to use a second media playback protocol. The first media playback protocol and the second media playback protocol may be incompatible. Operations may further include transmitting, to a second networked device, the media stream. The first networked device and second networked device are configured to operate in a bonded zone.

20 Claims, 8 Drawing Sheets

Related U.S. Application Data

(60) Provisional application No. 62/554,566, filed on Sep. 5, 2017.

(51) Int. Cl.

| | | |
|---|---|---|
| *G06F 3/16* | (2006.01) | |
| *H04L 69/08* | (2022.01) | |
| *H04N 21/81* | (2011.01) | |
| *H04L 12/28* | (2006.01) | |
| *H04N 21/4363* | (2011.01) | |
| *H04L 12/18* | (2006.01) | |
| *H04N 21/43* | (2011.01) | |
| *H04L 65/61* | (2022.01) | |
| *H04L 65/613* | (2022.01) | |
| *H04N 21/2381* | (2011.01) | |
| *H04N 21/436* | (2011.01) | |
| *H04N 21/2668* | (2011.01) | |
| *H04L 65/1069* | (2022.01) | |
| *H04R 27/00* | (2006.01) | |
| *H04L 65/65* | (2022.01) | |
| *H04L 67/51* | (2022.01) | |

(52) U.S. Cl.
CPC .......... *H04L 12/2803* (2013.01); *H04L 65/61* (2022.05); *H04L 65/613* (2022.05); *H04L 69/08* (2013.01); *H04L 69/18* (2013.01); *H04N 21/2181* (2013.01); *H04N 21/2381* (2013.01); *H04N 21/2668* (2013.01); *H04N 21/4307* (2013.01); *H04N 21/4363* (2013.01); *H04N 21/43076* (2020.08); *H04N 21/43615* (2013.01); *H04N 21/8113* (2013.01); *H04L 65/1069* (2013.01); *H04L 65/65* (2022.05); *H04L 67/51* (2022.05); *H04L 2012/2849* (2013.01); *H04R 27/00* (2013.01); *H04R 2227/005* (2013.01)

(58) Field of Classification Search
CPC ....... H04N 21/43076; H04N 21/43615; H04N 21/4363; H04N 21/8113; G06F 3/165; H04L 12/1822; H04L 12/2803; H04L 65/61; H04L 65/613; H04L 69/08; H04L 69/18; H04L 65/1069; H04L 65/65; H04L 67/51; H04L 2012/2849; H04R 27/00; H04R 2227/005

See application file for complete search history.

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Oureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 10,154,122 B1* | 12/2018 | Coburn, IV | ............ H04L 65/61 |
| 10,219,091 B2 | 2/2019 | Lai et al. | |
| 10,623,250 B1 | 4/2020 | Gaeta et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2003/0225765 A1* | 12/2003 | Frieden | ................. G06F 16/954 |
| | | | 707/999.009 |
| 2004/0024478 A1 | 2/2004 | Hans et al. | |
| 2007/0142944 A1 | 6/2007 | Goldberg et al. | |
| 2007/0214370 A1 | 9/2007 | Sato et al. | |
| 2009/0268754 A1* | 10/2009 | Palm | ................... H04L 67/5651 |
| | | | 370/466 |
| 2011/0004330 A1 | 1/2011 | Rothkopf et al. | |
| 2011/0270955 A1 | 11/2011 | Baldini et al. | |
| 2012/0099594 A1 | 4/2012 | Lau et al. | |
| 2012/0147825 A1 | 6/2012 | Hassan et al. | |
| 2013/0170363 A1* | 7/2013 | Millington | ............ H04W 76/10 |
| | | | 370/252 |
| 2014/0122589 A1 | 5/2014 | Fyke et al. | |
| 2014/0237503 A1* | 8/2014 | Mukerji | ............ H04N 21/4758 |
| | | | 725/27 |
| 2014/0301574 A1 | 10/2014 | Gottlieb | |
| 2014/0358553 A1 | 12/2014 | Helmke et al. | |
| 2015/0026257 A1 | 1/2015 | Balakrishnan et al. | |
| 2015/0131643 A1* | 5/2015 | Oren | ..................... H04J 3/0697 |
| | | | 370/467 |
| 2015/0135072 A1 | 5/2015 | Agnihotri et al. | |
| 2015/0223002 A1 | 8/2015 | Mehta et al. | |
| 2015/0229700 A1* | 8/2015 | Marigondanahalli Rudrappa ....... | |
| | | | H04L 65/612 |
| | | | 709/203 |
| 2016/0036782 A1 | 2/2016 | Jeffrey et al. | |
| 2016/0227319 A1 | 8/2016 | Zhao et al. | |
| 2016/0266868 A1 | 9/2016 | Allen | |
| 2016/0294884 A1 | 10/2016 | Vincent et al. | |
| 2016/0357509 A1 | 12/2016 | Alsina et al. | |
| 2017/0041284 A1 | 2/2017 | Chen et al. | |
| 2017/0228211 A1 | 8/2017 | Daoud | |
| 2018/0190279 A1* | 7/2018 | Anderson | ................ G10L 15/22 |

FOREIGN PATENT DOCUMENTS

| | | |
|---|---|---|
| JP | 2016528757 A | 9/2016 |
| WO | 200153994 | 7/2001 |
| WO | 2003093950 A2 | 11/2003 |
| WO | 2013152426 A1 | 10/2013 |
| WO | 2014197583 A1 | 12/2014 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.
Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Nov. 25, 2019, issued in connection with U.S. Appl. No. 15/714,927, filed Sep. 25, 2017, 39 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 16, 2019, issued in connection with U.S. Appl. No. 15/714,927, filed Sep. 25, 2017, 37 pages.
Non-Final Office Action dated Jun. 2, 2020, issued in connection with U.S. Appl. No. 15/714,927, filed Sep. 25, 2017, 41 pages.
Notice of Allowance dated Mar. 24, 2021, issued in connection with U.S. Appl. No. 15/714,927, filed Sep. 25, 2017, 18 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004,16 pages.
Yamaha DME Designer 3.5 User Manual; Copyright 2004, 507 pages.
Japanese Patent Office, Office Action and Translation dated Mar. 29, 2022, issued in connection with Japanese Patent Application No. 2021-054553, 8 pages.

\* cited by examiner

GROUPED ZONES IN A SYSTEM WITH MULTIPLE MEDIA PLAYBACK PROTOCOLS

CROSS-REFERENCE TO RELATED APPLICATIONS

This application claims the benefit of priority under 35 USC § 120 as a continuation of U.S. patent application Ser. No. 15/714,927, titled "Grouped Zones in a System with Multiple Media Playback Protocols" and filed Sep. 25, 2017. U.S. patent application Ser. No. 15/714,927 claims priority to U.S. Provisional Application No. 62/554,566, titled "Adding a Playback Device to a Playback Session" and filed Sep. 5, 2017. The entire contents of each of these applications are incorporated herein by reference for all purposes.

This application is related to the following applications filed on the same day as U.S. patent application Ser. No. 15/714,927, and the contents of each are incorporated by reference herein: U.S. patent application Ser. No. 15/714,950, titled "Grouping in a System with Multiple Media Playback Protocols" and filed Sep. 25, 2017; and U.S. patent application Ser. No. 15/714,882, titled "Networked Device Group Information in a System with Multiple Media Playback Protocols" and filed Sep. 25, 2017.

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
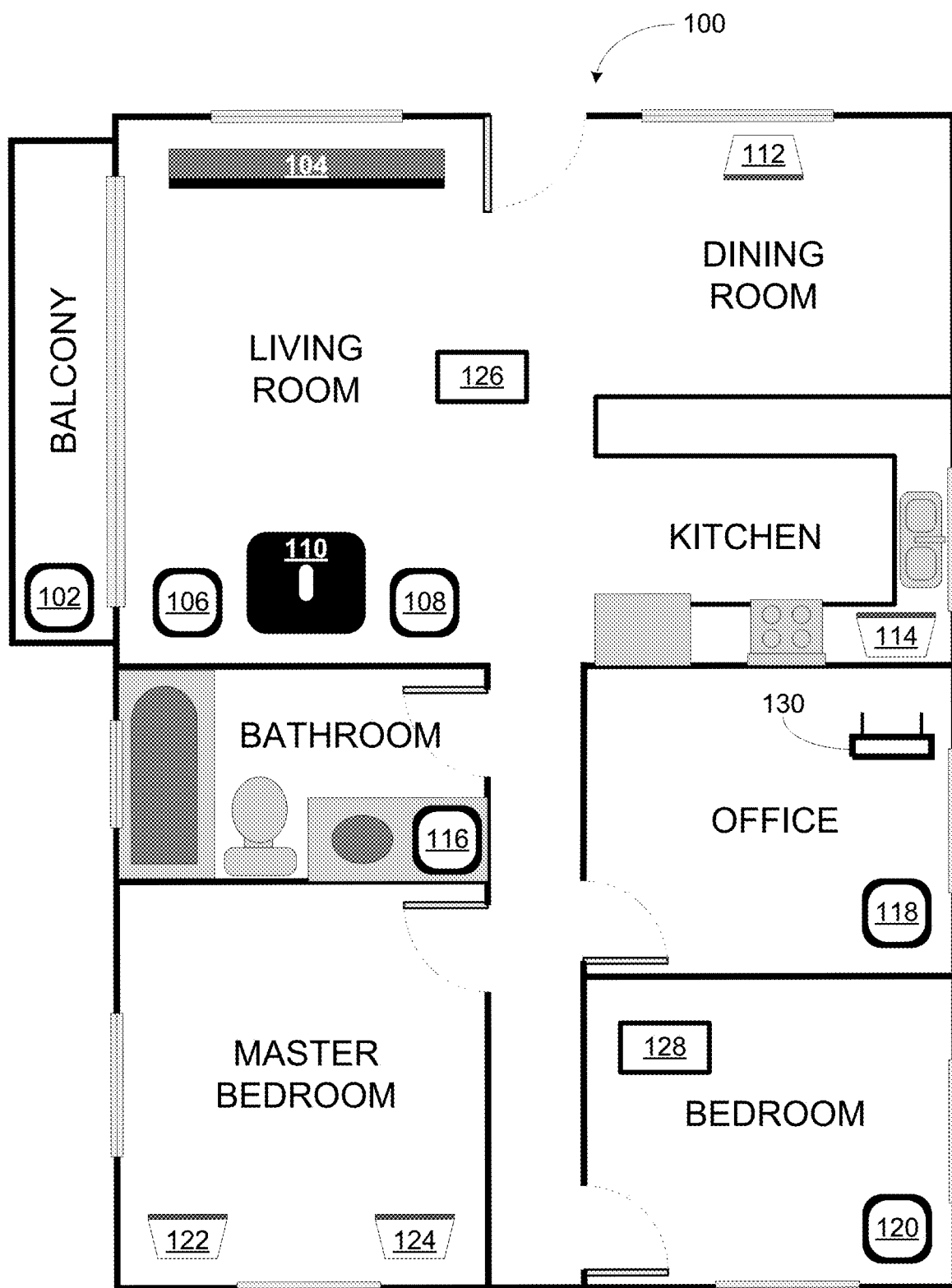
FIG. 1 shows an example media playback system configuration in which certain examples may be practiced.

The drawings are for the purpose of illustrating examples, but it is understood that the inventions are not limited to the arrangements and instrumentalities shown in the drawings.

DETAILED DESCRIPTION

I. Overview

Media playback systems may contain networked devices that are controllable by devices using different media playback protocols. A media playback protocol may refer to a set of guidelines a media playback system uses for implementing networking communications between networked devices (e.g., Apple® Airplay). In some cases, media playback systems implement more than one media playback protocol to provide a user with a seamless entertainment experience. For instance, a user may be able to stream media content to the media playback system through a variety of media source devices and control devices. These media source devices and control devices may be a dedicated controller for the media playback system or may be a network device on which media playback system controller application software may be installed, such as for example, an iPhone®, iPad® or any other smart phone, tablet or network device (e.g., a networked computer such as a PC or Mac®).

One challenge with allowing a media playback system to be compatible with multiple media playback protocols is an inability to consistently control and reflect changes to the media playback system across the multiple protocols. For instance, if a user initiates a playback session with multiple networked devices in an interface controlled by one media playback protocol, and then issues playback commands in an interface controlled by another media playback protocol, the playback commands might not result in the desired outcome (e.g., the other media playback protocol might not know to issue the playback commands to more than one networked device).

Users may also configure networked devices to operate in a bonded zone for synchronous playback of media content in an interface using a one media playback protocol and then try to control the bonded zone using an interface controlled by another media playback protocol. In these situations, it may be desirable for one of the networked devices to (i) receive, from a media source device, a media stream, (ii) convert the media stream to a media playback protocol compatible with a second networked device, and (iii) transmit, to the second networked device, the media stream.

This may allow the user to access an interface controlled by the second media playback protocol and control the networked devices even though one of the networked devices might not be compatible with the first media playback protocol. A first and second media playback protocol may be incompatible in that the first media playback protocol is unable to control playback associated with the second media playback protocol, and the second media playback protocol is unable to control playback associated with the first media playback protocol.

The disclosed examples describe functions performed by networked devices, voice enabled devices (VEDs), networked microphone devices (NMDs), audio playback devices (APDs), and video playback devices (VPDs). As used herein, the term networked device is a class of devices that includes, but is not limited to VEDs, NMDs, APDs, and VPDs.

The examples described herein provide a user seamless control over a media playback system via interfaces that are controlled by different media playback protocols.

In a first example, a first networked device may perform operations including receiving, from a media source device, a media stream. The first networked device may be configured to use a first media playback protocol and the media source device may be configured to use a second media playback protocol. The first media playback protocol and the second media playback protocol may be incompatible. The first example may further include transmitting, to a second networked device, the media stream. The first networked device and second networked device are configured to operate in a bonded zone.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other examples.

II. Example Operating Environment

FIG. 1 shows an example configuration of a media playback system 100 in which one or more examples disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
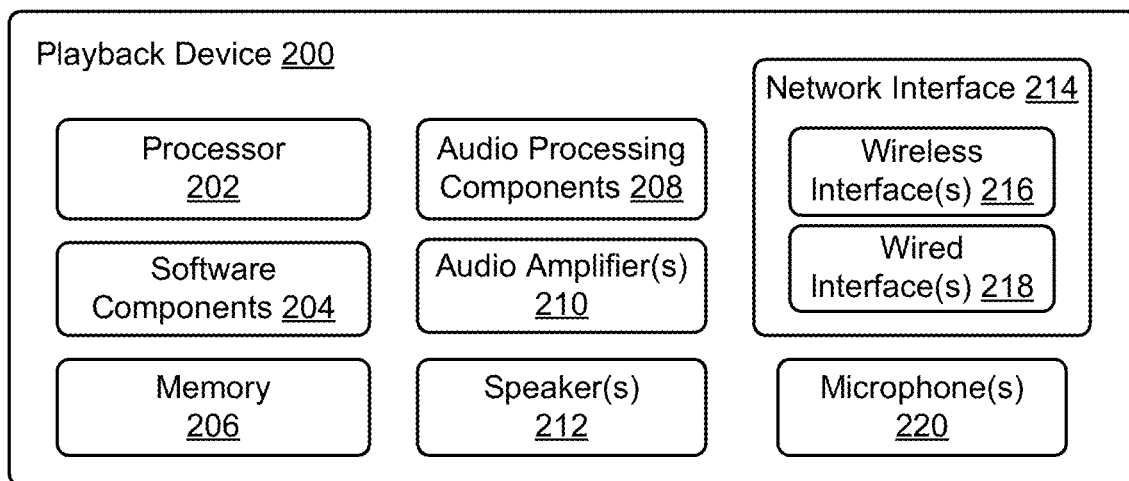
FIG. 2 shows a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 may include voice-enabled devices (VEDs).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other examples are also possible.

The audio processing components 208 may include one or more digital-to-analog converters (DAC), an audio preprocessing component, an audio enhancement component or a digital signal processor (DSP), and so on. In one example, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some examples include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of examples disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some examples, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
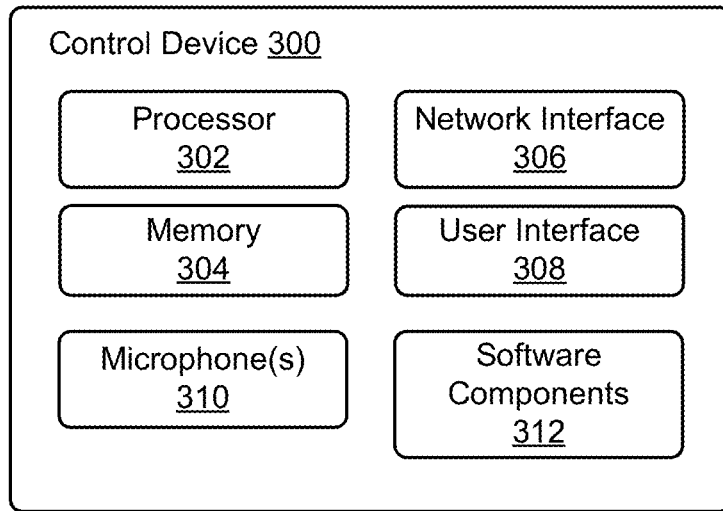
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone®, iPad® or any other smart phone, tablet or network device (e.g., a networked computer such as a PC or Mac®).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
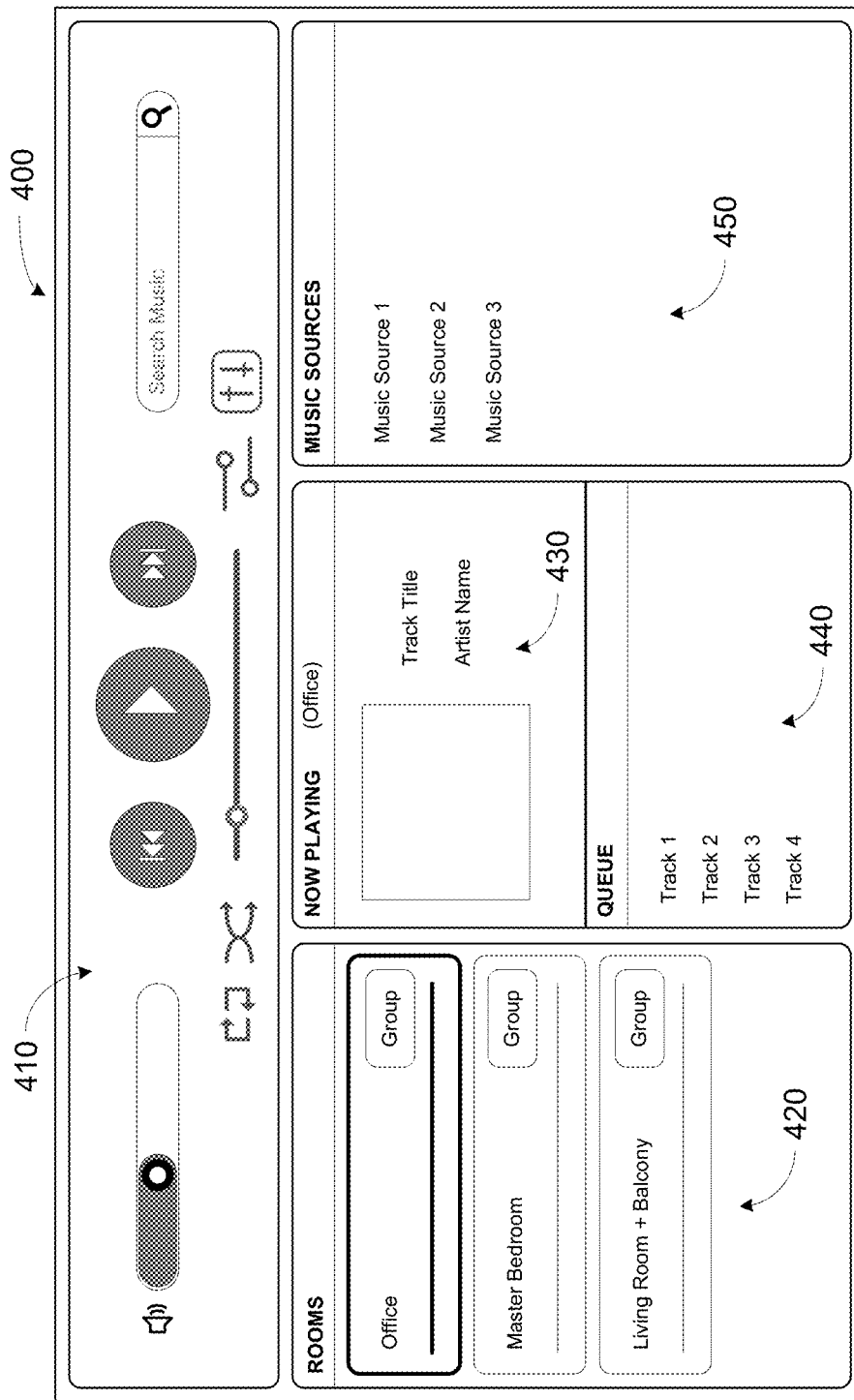
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some examples, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some examples, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative example, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some examples, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
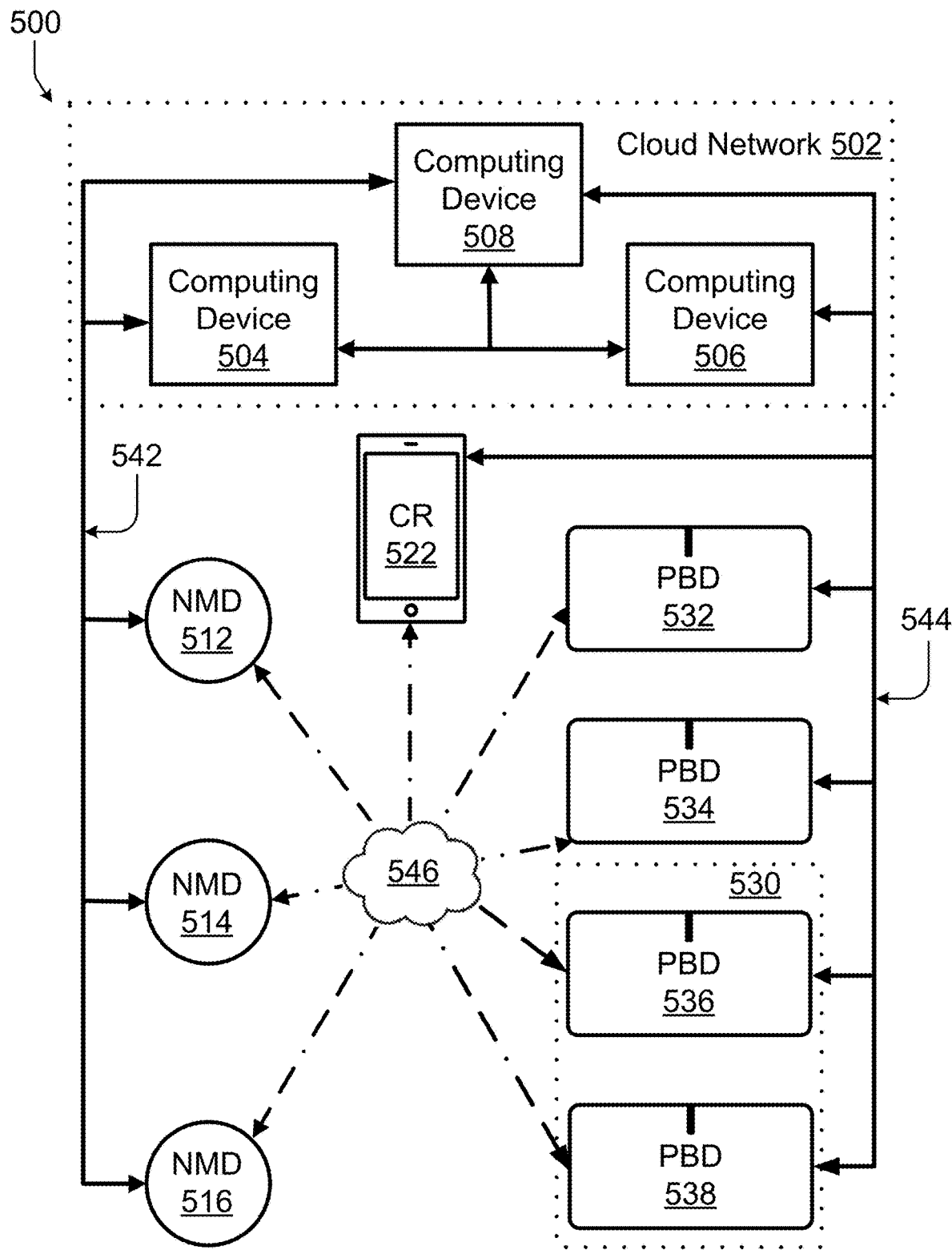
FIG. 5 shows an example plurality of network devices.

FIG. 5 shows an example plurality of networked devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of networked devices 500 includes computing devices 504, 506, and 508; network microphone devices (NMDs) 512, 514, and 516; playback devices (PBDs) 532, 534, 536, and 538; and a controller device (CR) 522. As described previously, any one or more (or all) of the NMDs 512-16, PBDs 532-38, and/or CR 522 may be voice-enabled devices (VEDs).

Each of the plurality of networked devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some examples, one or more of NMDs 512, 514, and/or 516 may be a microphone on a mobile computing device (e.g., a smartphone, tablet, or other computing device).

As shown, the computing device 506 is configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or CR 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
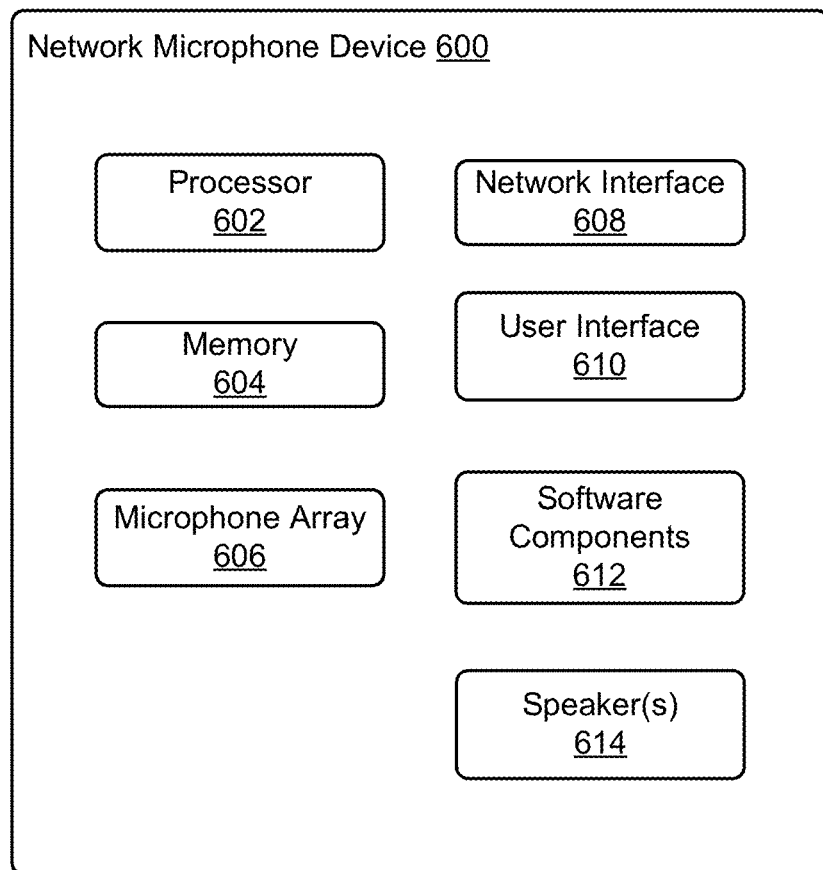
FIG. 6 shows a function block diagram of an example network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some examples the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

g. Example Media Playback Environment

It may be desirable in some instances for a user to control and play media content on networked devices where the media content may be played using a first media playback protocol and controlled using a first media playback protocol and/or a second media playback protocol. In some circumstances, media playback systems may be able to receive media content from one or more media sources using different media playback protocols. However, this method might not allow for consistent control across the two or more media playback protocols (e.g., starting media streams, issuing playback commands, grouping networked devices, controlling volume, etc.). To enable control of the networked devices across different media playback protocols, in some examples, networked devices may include hardware and/or software components to facilitate communication and control of networked devices using one or more different media playback protocols. This may be beneficial because it allows a user's actions using one media playback protocol to be converted and/or reflected in another media playback protocol, providing the user with a seamless experience independent of the media playback protocol that the user is using.

For instance, a user may have a media playback system including one or more networked devices. The one or more networked devices may be able to receive media from, and be controlled by, a first control device or application on the first control device using one media playback protocol (e.g., an iPhone® using Airplay). The one or more networked devices may also be able to retrieve media over a wide area network (WAN) from a remote server and be controlled by a second control device or application (e.g., a Sonos® controller) using another media playback protocol. If the user starts a media stream to or media playback at the one or more networked devices using one media playback protocol on a first control device, the user may be able to control (e.g., play/pause/skip song) the media stream using another media playback protocol on a second control device. This feature provides the user with the freedom to stream and control media content to networked devices using whichever control device is most convenient to the user. In some aspects, the first control device and the second control device may be the same device (e.g., computing device, mobile phone, tablet, etc.).

Figure 7:
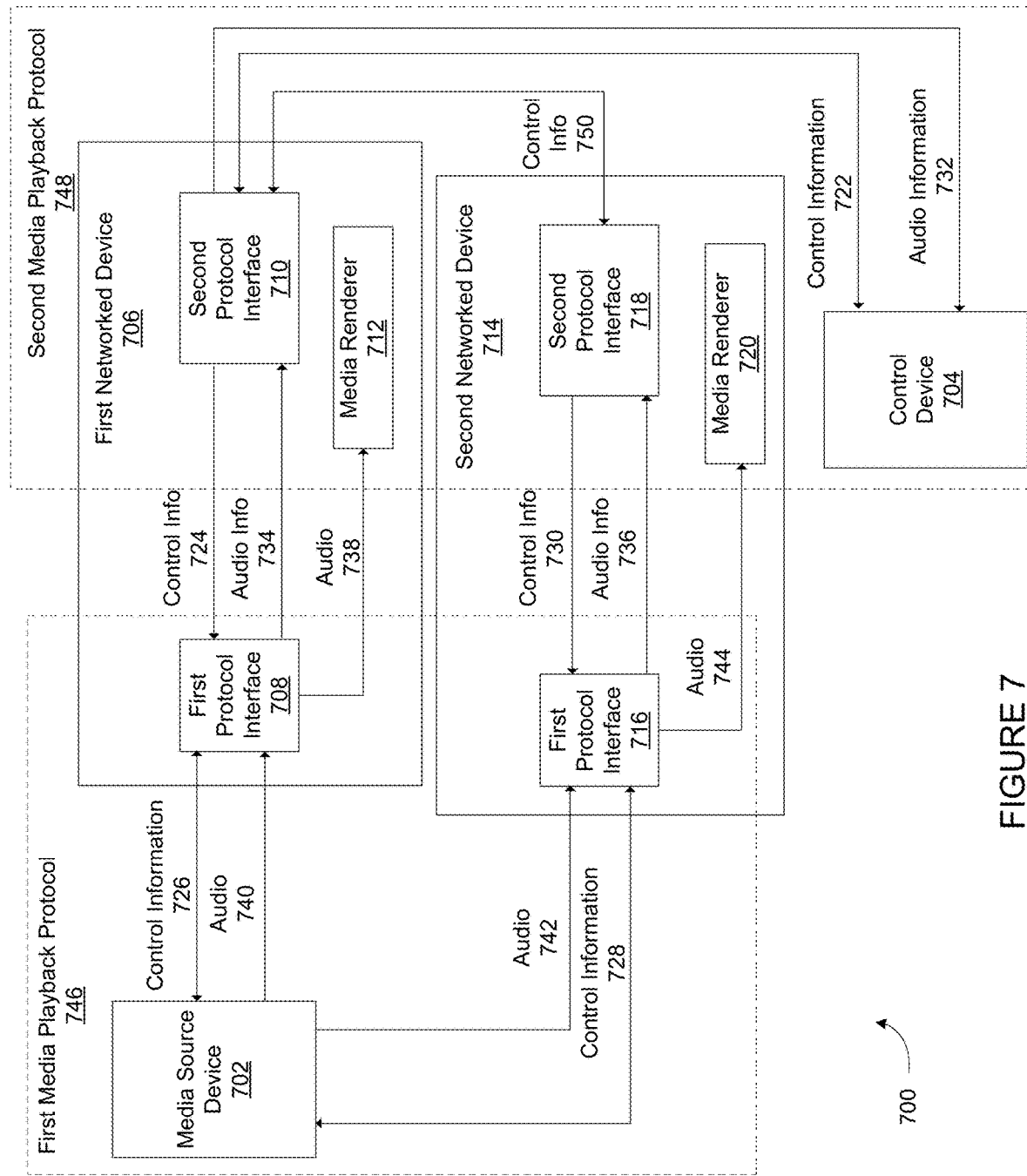
FIG. 7 shows a flow diagram of an example media playback system.

FIG. 7 shows a flow diagram of an example media playback system 700 that includes a media source device 702 and a control device 704 which are configured to control a first networked device 706 and a second networked device 714. First networked device 706 and second networked device 714 may be configured to play back media synchronously or independently. First networked device 706 and second networked device 714 may be any of playback devices 102-124 in FIG. 1, playback device 200 in FIG. 2, NMDs 512, 514, 516, and PBDs 532, 534, 536, 538 in FIG. 5, and/or network microphone device 600 in FIG. 6.

First networked device 706 includes a first protocol interface 708, a second protocol interface 710, and a media renderer 712. Second networked device 714 includes a first protocol interface 716, a second protocol interface 718, and a media renderer 720. Media source device 702 and first protocol interfaces 708 and 716 may operate according to first media playback protocol 746. Control device 704 and second protocol interfaces 710 and 718 are part of a second media playback protocol 748.

Media source device 702 may be a network device from which first networked device 706 and second networked device 714 receive media content in a particular media playback protocol. Media source device 702 may include similar components to control device 300 of FIG. 3, and may operate using a particular media playback protocol, such as first media playback protocol 746. For example, media source device 702 may include an iPhone®, iPad®, or any other smart phone, tablet or network device that uses a particular media playback protocol (e.g., airplay). Media source device 702 communicates with first protocol interface 708 of first networked device 706 via a network connection. Control commands in first media playback protocol may be communicated as control information 726 via the network connection. Streaming audio content 740 may also be communicated via the network connection. In some instances, control information 726 is communicated along with audio content 740, while in other instances control information 726 is communicated separately from audio content 740. Media source device 702 can communicate with first protocol interface 716 of second networked device 714 via control information 728 and audio content 742. Control information 722 and 726 may be transmitted over the respective network connections and be configured to control media playback of first networked device 706 and second networked device 714, respectively.

Control device 704 may be a network device that transmits control commands or instructions to first networked device 706 and second networked device 714. Control device 704 may include similar components to control device 300 of FIG. 3. In one example, control device 704 may be a dedicated controller for control environment 700. In another example, control device 704 may be a network device or other computing device on which a media playback system controller application may be installed, such as an iPhone®, iPad®, or any other smart phone, tablet, or network device. In yet other examples, control device 704 may be the same device as media source device 702. In other words, control device 704 may be configured to use the first media playback protocol 746 and the second media playback protocol 748. Control device 704 communicates with second protocol interface 710 of first networked device 706 via control information 722 and audio information 732. Control information 722 may include control commands to control media playback on first networked device 706 and/or second networked device 714.

In some examples, first networked device 706 and second networked device 714 may be grouped to play back media synchronously in second media playback protocol 748. In a group, first networked device 706 may act as a group coordinator. As group coordinator, first networked device 706 may be responsible for receiving control information from control device 704 and transmitting the control information to other group members. For example, control device 704 may send additional control information 722 such as playback commands to first networked device 706 when first networked device 706 is acting as a group coordinator, and first network device 706 may communicate the control information to second networked device 714. For example, the control commands controlling the second networked device 706 may be transmitted from second protocol interface 710 of first networked device 706 to second protocol interface 718 of second networked device 714.

First networked device 706 may be a networked device such as any of a voice enabled device (VED), networked microphone device (NMD), audio playback device (APD), video playback device (VPD), or any other networked device. These devices may optionally include one or more microphones and one or more speakers and/or speaker drivers. First networked device 706 includes a first protocol interface 708, a second protocol interface 710, and a media renderer 712. First networked device 706 may be configured to receive audio content 740 from media source device 702 and control information 722 from control device 704. First networked device 706 may further be configured to send audio information 732 (e.g., metadata such as album information, cover art, artist information, track name, radio station name, etc.) to control device 704. First networked device 706 may be further configured to send and/or receive control information 750 to/from second networked device 714.

First protocol interface 708 may be a hardware and/or software component configured to (i) receive media or audio content in an audio stream 740 sent by media source device 702, (ii) convert (e.g., decrypt, decompress, and/or decode) audio content 740, and (iii) send the converted audio 740 to media renderer 712. First protocol interface 708 may additionally be configured to (i) receive control information 724 from second protocol interface 710 and (ii) send audio information 734 to second protocol interface 710. First protocol interface 708 may additionally be configured to send control information 726 to media source device 702.

Second protocol interface 710 may be a hardware and/or software component configured to (i) receive control information 722 from control device 704 and (ii) send audio information 732 to control device 704. Second protocol interface 710 may additionally be configured to (i) send control information 724 to first protocol interface 708 and (ii) receive audio information 734 from first protocol interface 708. Second protocol interface 710 may additionally be configured to send and/or receive control information 750 to/from second protocol interface 718.

Media renderer 712 may be a hardware and/or software component configured to (i) receive audio data 738 from first protocol interface 708 and (ii) render audio data 738 for playback.

Second networked device 714 may be a networked device such as any of a voice enabled device (VED), networked microphone device (NMD), audio playback device (APD), video playback device (VPD), or any other networked device comprising one or more microphones and one or more speakers. Second networked device 714 includes a first protocol interface 716, a second protocol interface 718, and a media renderer 720. Second networked device 714 may be configured to receive audio content 742 from media source device. First networked device 706 may further be configured to send second control information 728 to media source device 702. Second networked device 714 may additionally be configured to send and/or receive control information 750 to/from first networked device 706.

First protocol interface 716 may be a hardware and/or software component configured to (i) receive audio content 742 sent by media source device 702, (ii) convert (e.g., decrypt, decompress, and/or decode) audio content 742, and/or (iii) send the converted audio content 742 to media renderer 720. First protocol interface 716 may additionally be configured to (i) receive control information 730 from second protocol interface 718 and/or (ii) send audio information 736 to second protocol interface 718. First protocol interface 716 may additionally be configured to send control information 728 to media source device 702.

Second protocol interface 718 may be a hardware and/or software component configured to send control information 730 to first protocol interface 716. Second protocol interface 710 may additionally be configured to send and/or receive control information 750 to/from second protocol interface 710.

Media renderer 720 may be a hardware and/or software component configured to (i) receive audio 744 data from first protocol interface 716 and (ii) render audio data 744 for playback.

First media playback protocol 746 may be a set or system of protocols used by media source device 702 to stream media content to first networked device 706 and second networked device 714. To discover networked devices available for playback, first media playback protocol 746 may include a discovery stage. A control device may transmit (e.g., broadcast, multicast, unicast) a discovery message (e.g., mDNS message) to devices on the network. First networked device 706 and second networked device 714 can advertise themselves by responding to the discovery message. Media source device 702 may determine from the discovery response message that first networked device 706 and second networked device 714 support first media playback protocol 746. For example, the discovery response message may contain information identifying or listing first media playback protocol 746 as a protocol supported by first networked device 706.

After identifying that first networked device 706 and second networked device 714 support first media playback protocol 746, media source device 702 may open a connection (e.g., via real-time streaming protocol (RTSP) setup message) with first networked device 706 and a connection with second networked device 714. Then, media source device 702 may send audio content 740 using an audio stream (e.g., real-time transport protocol (RTP) stream) which may be a unicast stream. Audio content 740 may optionally contain metadata (e.g., secondary data related to the media content) in the same stream or different stream. First networked device 706 and second networked device 714 may send media playback controls (e.g., play, pause, next track, and volume adjustments) to media source device 702 if a user inputs the commands on first networked device 706, second networked device 714, control device 704, or media source device 702.

Second media playback protocol 748 may be a set or system of protocols used by control device 704 to control various features of first networked device 706 and second networked device 714. Second media playback protocol 748 may involve the same or similar protocols implemented by playback device 200, control device 300, controller interface 400, plurality of networked devices 500, and/or network microphone device 600.

In operation, media source device 702 may stream audio content 740 to first networked device 706. Audio content 740 may contain metadata including information about audio content 740 (e.g., song title, runtime, album art, artist, radio station name, etc.) First protocol interface 708 of first networked device 706 may receive audio content 740 and its corresponding metadata from media source device 702. First protocol interface 708 may then decrypt, decompress audio content 740, and/or decode into audio data 738 and send audio data 738 to media renderer 712 for rendering and playback. First protocol interface 708 may send audio information 734 to second protocol interface 710. Audio information 734 may contain the metadata sent with and/or corresponding to audio content 740 to first protocol interface 708 of first networked device 706. Second protocol interface 710 may send audio information 732 to control device 704. Audio information 732 may contain the meta data sent with and/or corresponding to audio content 740 which may be currently played back by first networked device 706. Control device 704 may display audio information 732 on a graphical interface to identify media currently being played back.

Media source device 702 may additionally stream audio content 742 to networked device 714 in an audio stream (e.g., unicast stream, multicast stream). Audio content 742 and audio content 740 may contain the same media content or may be different portions of the same media content. Networked device 706 and networked device 714 may play audio content 740,742 in synchrony using playback timing information included with audio content 740, 742. For example, networked device 706 and networked device 714 may be grouped for synchronous media playback. As yet another example, if first networked device 706 and second networked device 714 are configured to operate in a stereo pair, first networked device 706 may operate as a "right" speaker and second networked device 714 may operate as a "left speaker." In one example, audio content 740 may represent the "right" portion of the media content and audio 742 may represent the "left" portion of the media content. In another example, audio content 740 and 742 may contain the same media content. First networked device 706 may extract and playback the "right" portion of audio content 740 and second networked device 714 may extract and playback the "left portion" of audio content 742.

First protocol interface 716 of second networked device 714 may then receive audio 742 and its corresponding metadata from media source device 702. First protocol interface 716 may then decrypt, decompress, and/or decode audio content 742 into audio data 744 and send audio data 744 to media renderer 720 for rendering and playback. First protocol interface 716 may send audio information 736 to second protocol interface 718. Audio information 736 may contain the metadata sent with audio content 742 to first protocol interface 716.

Second protocol interface 710, after receiving audio information 734 from first protocol interface 708, may convert audio information 734 to a format compatible with second media playback protocol 748 and send the converted audio information to control device 704 as audio information 732. In some aspects, second protocol interface 710 may be compatible with audio information 734 without conversion, or the second protocol interface 710 may be configured to convert audio information 734. Control device 704 receives audio information 734, which allows control device 704 to display to the user the media content playing on first networked device 706. This is beneficial because it allows a user to start a media stream through media source device 702 and then later view what is playing via control device 704.

A user may issue a playback command via control device 704 to, for example, pause the media content. Control device 704 may send, in a format compatible with second media playback protocol 748, the pause command as part of control information 722 to second protocol interface 710 of first networked device 706. Second protocol interface 710 may receive the pause command and convert the pause command to a format compatible with first media playback protocol 746. Second protocol interface 710 may send the pause command as part of control information 724 to first protocol interface 708. Second protocol interface 710 may also send the unconverted pause command to second protocol interface 718 of second networked device 714 as part of control information 750. After receiving the pause command from second protocol interface 710, second protocol interface 718 may convert the pause command to a format compatible with first media playback protocol 746. Second protocol interface 718 may send the converted pause command to first protocol interface 716 as a part of control information 730. For example, second protocol interface 710 may receive the pause command as a UPnP message, and transmit an instruction to pause playback to first protocol interface 708, and first protocol interface 708 may transmit the pause instruction as a RTSP request. The RTSP request may include a session identifier to identify the current playback session. The session identifier may be a number or string that identifies the media stream such as a session universally unique identifier (UUID), client-instance information, or DACP-ID.

First protocol interface 708 may receive the pause command through control information 724 from second protocol interface 710 and send the pause command to media source device 702 as part of control information 726. Similarly, first protocol interface 716 may receive the pause command as part of control information 730 from second protocol interface 718 and send the pause command to media source 702 as part of control information 728.

Media source device 702 may receive the pause command from first networked device 706 through control information 726 and from second networked device 714 through control information 728. After receiving the pause command, media source device 702 may temporarily stop sending audio content 740 and audio content 742 to first networked device 706 and second networked device 714, respectively.

While the systems and methods described herein are described in the context of two networked devices (first networked device 706 and second networked device 714), the methods and interactions are equally applicable to media playback systems including any number of networked devices (e.g., only one networked device or more than two networked devices).

III. Example Systems and Methods

One challenge for media playback systems that are compatible with multiple media playback protocols may be an inability to effectively control networked devices configured to operate in a bonded zone. Networked devices may be in a bonded zone when they are configured to effectively operate as one networked device in a particular area (e.g., two networked devices operating as one in a kitchen). For instance, if a control device issues a command to one networked device in a bonded zone, the command is forwarded to the other networked devices in the bonded zone. One media playback protocol may treat networked devices configured in a bonded zone in a particular way (e.g., network topology) that is not compatible with another media playback protocol. Thus, if a user attempts to control bonded networked devices using a different media playback protocol than the media playback protocol that was used to initially set up the networked devices in a bonded zone, a user might not be able to effectively control the networked devices using a media playback protocol different than the one used for initial setup.

To provide continuous control independent of the underlying media playback protocol that is being used, in some examples, a first networked device may be configured to use a first media playback protocol to (i) receive, from a media source device, a media stream, where the media source device is configured to use a second media playback protocol that is incompatible with the first media playback protocol, and (ii) transmit, to a second networked device, the media stream, where the first networked device and second networked device are configured to operate in a bonded zone. This may be beneficial in circumstances where the media stream is initiated from a media source device that uses a media playback protocol that is not compatible with the media playback protocol of a control device because it may allow a user to effectively stream and control media playback to the bonded zone independent of the media playback protocols used by the media source device and control device.

For instance, a user may configure two or more networked devices to operate in a bonded zone using a controller uses a particular media playback protocol (e.g., a Sonos™ controller). The user may then want to stream media content to the two or more networked devices using a media source device that uses a different media playback protocol (e.g., an iPhone® using Airplay). However, not all of the networked devices in a bonded zone may be able to receive a stream of media content in the media playback protocol associated with the media source device. For example, one of the networked devices might not be configured to communicate with other devices in the media playback system using the first media playback protocol, and another of the networked devices may be configured to communicate with other devices in the media playback system using the first media playback protocol and/or the second media playback protocol. One of the two or more networked devices may be able to receive the media stream from the media source device and transmit the media stream to the other networked devices in the bonded zone. This allows one of the two or more networked devices to handle the conversion of the media content from the media playback protocol associated with the media stream and/or media source device to the media playback protocol associated with the other networked device or the controller, including the synchronization of timing for playing back media content.

Figure 8:
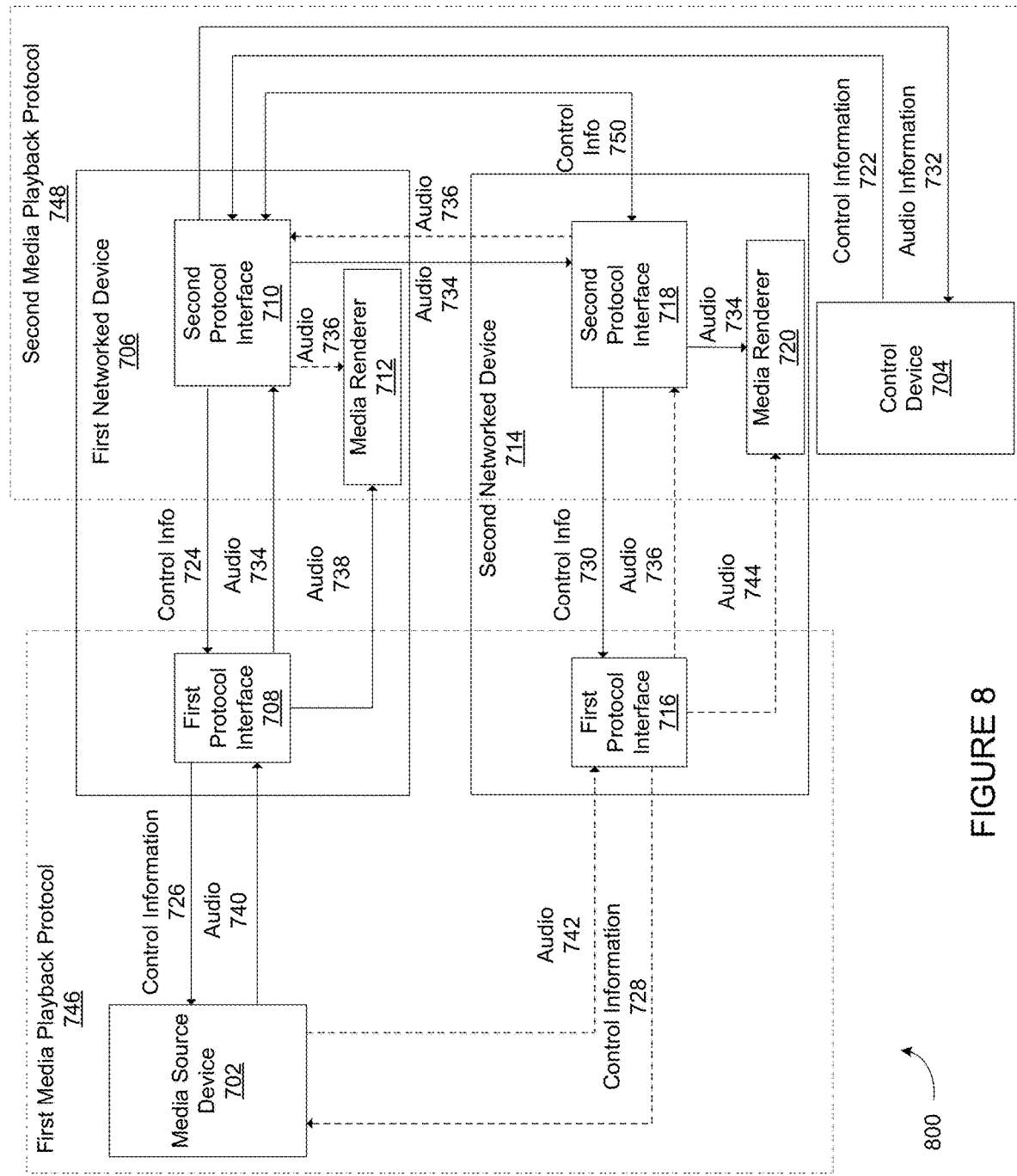
FIG. 8 shows a flow diagram of an example media playback system.

FIG. 8 depicts a flow diagram for media playback system 800. Media playback system 800 includes the same components that correspond to the same media playback protocols of media playback system 700 in FIG. 7. In media playback system 800, first networked device 706 and second networked device 714 are configured to operate in a bonded zone. In operation, one or both of first networked device 706 and second networked device 714 may be configured to receive media content from media source device 702 and transmit the media content to one another.

In some examples, a first networked device may receive media content from a source device using one media playback protocol and transmit the media stream to a second networked device using a different media playback protocol. For example, in FIG. 8, first networked device 706 may receive audio content 740 from media source device 702. As previously discussed, media source device 702 may operate under first media playback protocol 746. First networked device 706 may, via first protocol interface 708, convert audio content 740 into audio content 734, which is in a format compatible with second media playback protocol 748. First protocol interface 708 may send audio content 734 to second protocol interface 710. First networked device 706 may transmit, via second protocol interface 710, audio content 734 to second protocol interface 718 of second networked device 714 for playback by media renderer 720.

In some examples, a first networked device may determine it is the bonded zone coordinator of a bonded zone including two or more networked devices. The networked devices in the bonded zone that are not the bonded zone coordinator may be referred to herein as "bonded zone members." The bonded zone coordinator may be responsible for (i) receiving the media stream from the media source device, (ii) transmitting the media stream to the other networked devices in the media system, (iii) receiving commands from a control device, and/or (iv) transmitting the commands to the other networked devices in the media system. This may be beneficial because the bonded zone coordinator can control the timing and synchronization of all media streams from the media source device and commands from the control device.

In some aspects, the bonded zone coordinator may be responsible for advertising, to the media source device, playback availability of networked devices in the bonded zone by, for example, transmitting a networked device identity to the media source device. The networked device identity may include the network identity of the bonded zone coordinator and the bonded zone members. The bonded zone coordinator may transmit the networked device identity in response to a discovery message (e.g., mDNS query message) received from the media source device. The bonded zone members might not transmit a networked device identity.

For example, first networked device 706 may determine it is the bonded zone coordinator of the bonded zone including first networked device 706 and second networked device 714. First networked device 706 may transmit a networked device identity in discovery response message (e.g., mDNS response message) in response to a broadcasted discovery message (e.g., mDNS query). In some aspects, first networked device 706 may broadcast a networked device identity via a discovery protocol (e.g., mDNS) for discovery by media source device 702. The networked device identity may include the network identity for first networked device 706 and second networked device 714 (e.g., "Kitchen"—if first networked device 706 and second networked device 714 are configured in a bonded zone in a kitchen). In this example, second networked device 714, since it is not the bonded zone coordinator, does not transmit a networked device identity.

In some examples, determining the bonded zone coordinator may involve determining a capability exists to receive media content from the media source device or receive content using a first media playback protocol. For instance, a media playback system may include three networked devices configured to operate in a bonded zone. However, only one of the three networked devices may be capable of receiving media content from the media source device. In this situation, the networked device that is capable of receiving the media content from the media source device might determine it is the bonded zone coordinator and the other two networked devices may determine they are bonded zone members. This might be beneficial because the first networked device is able to receive a media stream in the first media playback protocol from the media source device and transmit the media stream to the bonded zone members.

In some aspects, determining which networked device is the bonded zone coordinator may involve determining that a compatibility exists between a first networked device and a source type of the media stream and a compatibility does not exist between a second networked device and the source type of the media stream. The source type of the media stream may include the type of connection that the media is being streamed over (e.g., Bluetooth™, WiFi, etc.) and/or the media playback protocol being used for the media (e.g., first media playback protocol or second network media playback protocol). For example, a networked device that is not configured with a first protocol interface might not be able to receive content from the media source device, and a networked device which is configured to have a first protocol interface may be capable of receiving media content from the media source device. As yet another example, the first networked device may be compatible with Bluetooth™, while the second networked device is not. In this situation, if the media source device is instructed by a user to stream media over a Bluetooth™ connection, the first networked device may determine it should be the bonded zone coordinator and the second networked device should be a bonded zone member.

In some examples, the bonded zone coordinator may filter the media stream before transmitting the media stream to bonded zone members. The bonded zone coordinator may filter the media stream by decrypting and/or decompressing the media stream. For example, first networked device 706 may determine it is the bonded zone coordinator. First networked device 706 may receive audio content 740 via first protocol interface 708. First protocol interface 708 may decrypt audio content 740, converting it from audio content 740 that is compatible with first media playback protocol 746, to audio content 734 that is compatible with second media playback protocol 748. First protocol interface 708 may send the decrypted audio content 734 to second protocol interface 710. Second protocol interface 710 may decompress audio content 734 and transmit decompressed audio content 734 to second protocol interface 718 of second networked device 714 for playback.

In another example, first networked device 706 may receive audio content 740 via first protocol interface. First protocol interface 708 may transmit audio content 740 as audio content 734 to second protocol interface 710. Second protocol interface 710 may receive audio content 734 and decrypt audio content 734, converting audio content 734 from being compatible with first media playback protocol 746 to being compatible with second media playback protocol 748. Second protocol interface 710 may further decompress audio content 734 and transmit decrypted and decompressed audio content 734 to second protocol interface 718 of second networked device 714 for playback.

In some aspects, the bonded zone coordinator may transmit the media content in its native format for decryption and decompression by the bonded zone members. This may be beneficial in situations where the bonded zone coordinator has limited processing power or where the bonded zone members have more available processing power than the bonded zone coordinator.

For example, first networked device 706 may receive audio content 740 from media source device 702, and without decrypting or decompressing audio content 740, transmit audio content 734 to second networked device 714 via second protocol interfaces 710 and 718, respectively. In this example, audio content 734 and audio content 740 contain the same media content in the same media format.

In some examples, a user may issue a playback command on a bonded zone member (e.g., play, pause, skip song, etc.) in an interface controlled by a first media playback protocol. For example, a user may push a play/pause button integrated into the bonded zone member. The bonded zone member may (i) execute the playback command and (ii) send the same playback command to the bonded zone coordinator. After receiving the playback command from the bonded zone member, the bonded zone coordinator may (i) execute the playback command, (ii) convert the playback command to be compatible with a second media playback protocol and (iii) transmit the playback command to a media source device for execution.

For example, a user may issue a pause command to second networked device 714. Second networked device 714 may pause playback of audio content 734 and send, via second protocol interface 718, the pause command to second protocol interface 710 of first networked device 706 as part of control information 750. First networked device 706 may, via second protocol interface 710, (i) pause playback of audio content 738, (ii) convert the pause command that is compatible with second media playback protocol 748 to a pause command that is compatible with first media playback protocol 746, (iii) send the converted pause command to first protocol interface 708 as part of control information 724, and (iv) send, via first protocol interface 708, the converted pause command to media source device 702 as part of control information 726.

In some aspects, a user may issue the playback command using the second media playback protocol on the bonded zone coordinator which may be a group coordinator in the first media playback protocol and a group coordinator in the second media playback protocol. In response to receiving the playback command, the bonded zone may (i) execute the playback command, (ii) send the playback command to all bonded zone members in the bonded zone, (iii) convert the playback command to be compatible with a second media playback protocol and (iv) transmit the playback command to a media source device for execution.

For example, a user may issue a pause command to first networked device 706. First networked device 706 may pause playback of audio content 738 and send, via second protocol interface 70, the pause command to second protocol interface 718 of second networked device 714 as part of control information 750. First networked device 706 may also, via second protocol interface 710, (i) convert the pause command that is compatible with second media playback protocol 748 to a pause command that is compatible with first media playback protocol 746, (ii) send the converted pause command to first protocol interface 708 as part of control information 724, and (iii) send, via first protocol interface 708, the converted pause command to media source device 702 as part of control information 726.

In some circumstances, a bonded zone member may have the capability to receive the media stream from the media source device, but the bonded zone coordinator might not be capable of receiving the media content from the media source device. This may occur when a bonded zone coordinator is determined before the media source device attempts to stream media to the bonded zone. For instance, a first networked device and a second networked device may be set up to operate in a bonded zone controlled by second media playback protocol 748. Under the second media playback protocol, the first networked device may determine it should be the bonded zone coordinator. A user may attempt to stream, via a media source device using first media playback protocol 746, media content to the bonded zone. However, the first networked device might not be compatible with first media playback protocol 746.

To overcome this potential problem, the bonded zone coordinator may determine that a bonded zone member is a media receiver for first media playback protocol 746, and configure the bonded zone member to (i) receive the media stream from the media source device in first media playback protocol 746, and (ii) transmit the media stream to the first networked device.

In one example, in FIG. 8, first networked device 706 may be the bonded zone coordinator and might not be capable of receiving audio content 740 from media source device 702. However, second networked device 714 may be capable of receiving audio content 742 as indicated in an alternate version of FIG. 8 shown by the dotted lines. Second networked device 714 may receive audio content 742 from media source device 702 via first protocol interface 716. Second networked device 714 may, via first protocol interface 716, convert audio content 742 into audio content 736, which is in a format compatible with second media playback protocol 748. First protocol interface 716 may send audio content 734 to second protocol interface 718. Second networked device 714 may transmit, via second protocol interface 718, audio content 736 to second protocol interface 710 of first networked device 706 for playback by media renderer 712.

In another example, second networked device 714 may, via first protocol interface 716, send audio content 742 to second protocol interface 718 as audio content 736 for conversion. Second protocol interface 718 may receive audio content 736 and decrypt audio content 736, converting audio content 736 from being compatible with first media playback protocol 746 to being compatible with second media playback protocol 748. Second protocol interface 718 may further decompress audio content 736 and transmit decrypted and decompressed audio content 736 to second protocol interface 710 of first networked device 706 for playback by media renderer 712.

In some examples, the first networked device determining that the second networked device is the media receiver may involve receiving, from the second networked device, an indication that a capability exists for the second networked device to receive the media stream from the media source device using the first media playback protocol. For instance, first networked device might not recognize the media source device over the network because it is not capable of communicating with the media source device. In this situation, the second networked device may determine it is capable of receiving the media stream from the media source device and transmit an indicated of such to the first networked device. Upon receiving the indication that the second networked device is capable of receiving the media stream, the first networked device may determine the second networked device should be the media receiver.

In some aspects, the first networked device determining that the second networked device is the media receiver may involve determining, from a network topology, that a capability exists for the second networked device to receive the media stream from the media source device using the first media playback protocol. The network topology may include a table and/or database with information regarding the networked devices connected in a media playback system. The information stored in the network topology may include (i) a bonded zone status (e.g., whether the networked device is in a bonded zone and whether it is a bonded zone coordinator or member), (ii) media playback protocol compatibilities (e.g., the types of media playback protocols to which the networked device is compatible), and/or (iii) state variables associated with operational parameters of the networked device (e.g., processing power, hardware/software components, etc). The networked topology may be accessible by the networked devices in the media playback system and/or by a control device using the second media playback protocol. When a networked device is added to the network or when a networked device is modified, the networked device may update the network topology to add its information or reflect changes. For instance, if a networked device is added to a media playback system and the networked device is compatible with the first media playback protocol and the second media playback protocol, the networked device may update the network topology to reflect these compatibilities.

In some aspects, the first networked device determining that the second networked device is the media receiver may involve receiving, from the second networked device, an indication that the second networked device is the media receiver. For instance, the second networked device may determine it is the media receiver by comparing a first device identifier of the first networked device with a second device identifier of the second networked device. Each networked device in the media playback system may include a device identifier (e.g., a number or string that is advertised to the network topology of the media playback system). The second network device may determine it is the media receiver of the group if the second device identifier is a lower number or smaller string than the first device identifier. For example, in FIG. 8, first networked device 706 may have a first device identifier of "0987" and second networked device 714 may have a second device identifier of "0321." In this example, the second device identifier of "0321" is lower than the first device identifier of "0987." Since the second device identifier is lower than the first device identifier, the first networked device may determine that it is the group coordinator of the group including the first networked device and the second networked device.

In some circumstances, since the first networked device is not capable of communicating with the media source device, the first networked device is not capable of transmitting the networked device identity for the bonded zone. To enable advertising of the bonded zone, in some examples, the first networked device, based on determining that the second networked device is the media receiver, may cause the second networked device to transmit, to the media source device, a networked device identity. As discussed previously, the networked device identity may include the network identity of the bonded zone coordinator and the bonded zone members.

In some aspects, based on determining that the second networked device is the media receiver, the first networked device may receive, from the second networked device, an indication that the second networked device is transmitting, to the media source device, the networked device identity. In these examples, the second networked device may determine it should transmit the networked device identity by (i) accessing a network topology indicating which networked devices in the bonded zone are capable of receiving the media stream from the media source device, and (ii) determining that the second networked device is the only networked device in the bonded zone capable of receiving the media stream from the media source device. In some aspects, the second networked device may transmit the networked device identity based on determining that the second networked device is the media receiver for the first media playback protocol.

In some circumstances, in bonded zones that include two or more networked devices that are capable of receiving the media stream from the media source device, a media receiver may be selected based on one or more operational parameters. For example, the first networked device determining that the second networked device is the media receiver may involve determining that one or more operational parameters are associated with the second networked device. In these examples, the one or more operational parameters may include the existence of (i) a wired network connection between the second networked device and the first networked device, (ii) a wired network connection between the second networked device and the media source device, (iii) an indication of a power connection between the second networked device and a wall power source, (iv) operating in a stationary state, and (v) a processing power above a predefined threshold. As previously discussed, each networked device in the media playback system may update their respective state variables in the network topology indicating these operational parameters. These state variables may be accessible by any member of the media playback system and/or bonded zone.

In some examples, the first networked device (e.g., bonded zone coordinator) may determine the second networked device is the media receiver based on determining the existence of a wired network connection between the second networked device and the first networked device. This may be beneficial because it allows the second networked device to transmit the media stream to the first networked device via a wired connection quicker than a wireless network connection.

In some examples the first networked device may determine the second networked device is the media receiver based on determining the existence of a wired network connection between the second networked device and the media source device. This operational parameter may provide the benefit of the second networked device receiving the media stream from the media source device quicker than if the second networked device received the media stream via a wireless network connection.

In some examples the first networked device may determine the second networked device is the media receiver based on determining the existence of an indication of a power connection between the second networked device and a wall power source. The second networked device, by having a power connection through a wall power source, may be a more effective media receiver than a networked device that is battery operated. For instance, if the first networked device determined a networked device that is battery operated should operate as the media receiver and the batteries run out, the first networked device may temporarily lose its connection to the media source device. Thus, it may be beneficial for the first networked device to select the second networked device as media receiver based on its connection to a wall power source.

In some examples, the first networked device may determine the second networked device is the media receiver based on the second networked device's operation in a stationary state. In some media playback systems, networked devices may be portable in order to allow a user to customize their listening experience effortlessly. These portable networked devices may have different, less powerful components to facilitate their portability. Thus, it may be desirable for the first networked device to select a stationary networked device to be the media receiver, since it may have more powerful components to handle receiving the media stream and transmitting the media stream to other networked devices.

In some examples the first networked device may determine the second networked device is the media receiver based on determining the existence of a processing power above a predefined threshold. Different networked devices in a media playback system may have different processors with different processing capabilities. The process of receiving the media stream from the media source device and transmitting the media stream to the bonded zone coordinator may be taxing on the processor. Thus, it may be beneficial to select a media receiver with a processing power above a predefined threshold. The predefined threshold may be configurable based on the demands of the media stream (e.g., the size or length of the media stream, number of channels).

In some aspects, the first networked device may determine the second networked device is the media receiver based on determining the second networked device has the most amount of processing power available when compared to other networked devices in the bonded zone. For instance, the bonded zone may include three networked devices: the first networked device, the second networked device, and a third networked device. The first networked device may check the network topology to determine the available processing power for the second networked device and third networked device. If the first networked device determines the second networked device has more available processing power than the third networked device, the first networked device may determine the second networked device is the media receiver.

In some examples, the bonded zone coordinator (e.g., the first networked device) configuring the media receiver (e.g., the second networked device) to receive the media stream from the media source device and transmit the media stream to the first networked device may involve transmitting a command to the bonded zone member to receive the media stream from the media source device and transmit the media stream to the first networked device. The media receiver may transmit the media stream in the same format sent by the media source device or the media receiver may convert the media stream to a format compatible with the first networked device.

For example, in FIG. 8, first networked device 706 may be the bonded zone coordinator without the capability to receive media content from media source device 702. In response to determining first networked device 706 does not have the capability to receive media content from media source device 702, first networked device 706 may transmit a command to second networked device 714 to instruct to media source device 702 to begin sending audio content 742 to second networked device 714. Second networked device 714 may (i) receive audio content 742 (which is compatible with first media playback protocol 746) from media source device 702 via first protocol interface 716, (ii) convert audio content 742 into audio content 736 (which is compatible with second media playback protocol 748), and (iii) send, via second protocol interface 718, audio content 736 to first networked device 706 for playback via media renderer 712.

In another example, first networked device 706 may transmit a command to second networked device 714 to instruct to media source device 702 to begin sending audio content 742 to second networked device 714. Second networked device 714 may (i) receive audio content 742 (which is compatible with first media playback protocol 746) from media source device 702 via first protocol interface 716, and (ii) send, via second protocol interface 718, unconverted audio content 742 to first networked device 706 for conversion and playback.

In some examples, the bonded zone coordinator (e.g., the first networked device) may further configure the media receiver (e.g., the second networked device) to transmit the media stream to a third networked device. In these examples, the bonded zone includes more than two networked devices, and the media receiver may be responsible for transmitting the media stream to all networked devices in the bonded zone.

a. Example Method

Figure 9:
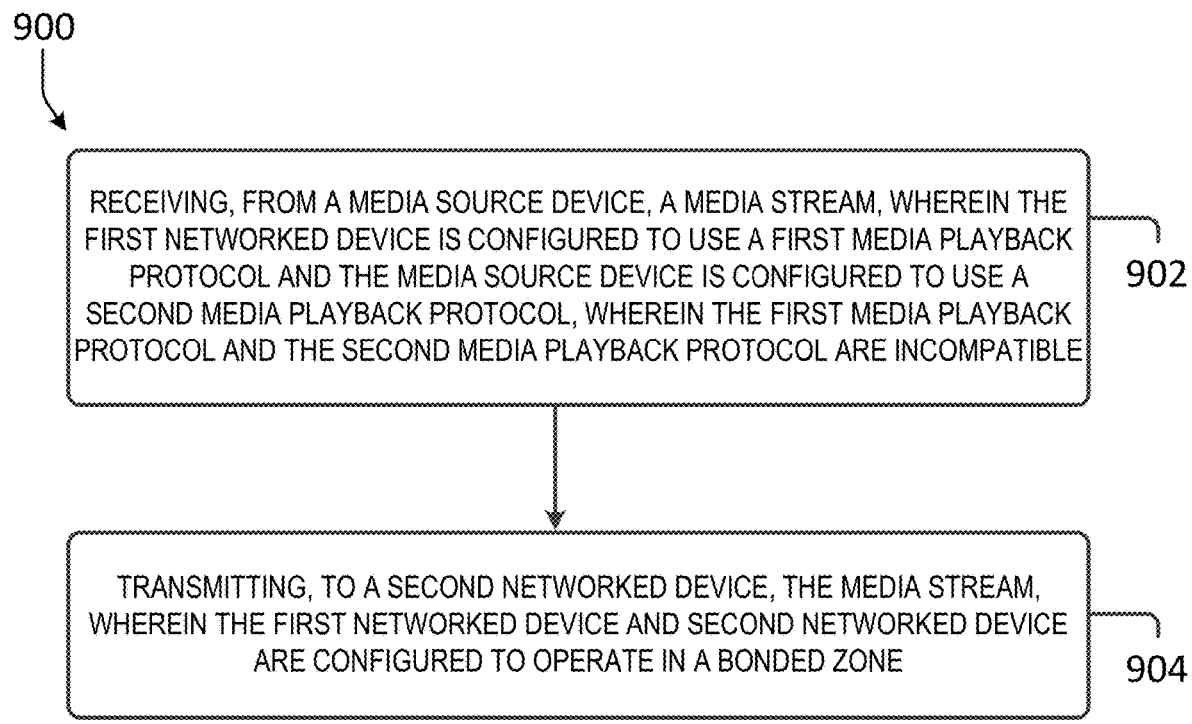
FIG. 9 shows an example method according to some examples.

Method 900 in FIG. 9 shows an example of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, the NMD shown in FIG. 6, the media playback system 700 in FIG. 7, and/or the media playback system 800 in FIG. 8. Method 900 may include one or more operations, functions, or actions as illustrated by one or more of blocks 902 and 904. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of some examples. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

Method 900 begins at block 902, which includes a first networked device (such as a computing device configured to control the first networked device), receiving, from a media source device, a media stream. The first networked device may be configured to use a first media playback protocol and the media source device may be configured to use a second media playback protocol. The first media playback protocol and the second media playback protocol are incompatible.

Next, method 900 advances to block 904, which includes, transmitting, to a second networked device, the media stream. The first networked device and second networked device may be configured to operate in a bonded zone.

Some examples further include the first networked device (i) determining that the first networked device is a bonded zone coordinator of the bonded zone comprising the first networked device and the second networked device, and (ii) based on determining that the first networked device is the bonded zone coordinator, transmitting, to the media source device, a networked device identity. In these examples, the networked device identity references the first networked device and the second networked device In some examples, transmitting, to the second networked device, the media stream includes (i) filtering the media stream, and (ii) transmitting, to the second networked device, the filtered media stream. In some examples, filtering the media stream may include decrypting the media stream and decompressing the media stream.

In some examples, transmitting, to the second networked device, the media stream includes transmitting the media stream in a native format for filtering by the second networked device.

Some examples further include the first networked device (i) receiving, from the second networked device, a playback command, (ii) converting the playback command to be compatible with the second media playback protocol, and (iii) sending the converted playback command to the media source device.

In some examples, determining that the first networked device is the bonded zone coordinator includes determining that a capability exists for the first networked device to communicate with the media source device using a first media playback protocol and a capability does not exist for the second networked device to communicate with the media source device using the first media playback protocol. In these examples, the first media playback protocol includes the first media playback protocol.

In some examples, determining that the first networked device is the bonded zone coordinator includes (i) determining a source type of the media stream, (ii) determining that a compatibility exists between the first networked device and the source type of the media stream, and (iii) determining that a compatibility does not exist between the second networked device and the source type of the media stream.

Some alternative examples include a first networked device (i) determining that the first networked device is a bonded zone coordinator of a bonded zone comprising the first networked device and a second networked device, (ii) determining that a capability does not exist for the first networked device to receive a media stream from a media source device using a first media playback protocol, (iii) determining that the second networked device is a media receiver, (iv) based on determining that the second networked device is the media receiver, configuring the second networked device to receive the media stream from the media source device and transmit the media stream to the first networked device, and (v) receiving, from the second networked device, the media stream.

In some examples, determining that the second networked device is the media receiver includes receiving, from the second networked device, an indication that a capability exists for the second networked device to receive the media stream from the media source device using the first media playback protocol.

In some examples, determining that the second networked device is the media receiver comprises receiving, from the second networked device, an indication that the second networked device is the media receiver.

Some examples further include based on determining that the second networked device is the media receiver, causing the second networked device to transmit, to the media source device, a networked device identity. In these examples, the networked device identity references the first networked device and the second networked device.

Some examples further include based on determining that the second networked device is the media receiver, receiving, from the second networked device, an indication that the second networked device is transmitting, to the media source device, a networked device identity. In these examples, the networked device identity references the first networked device and the second networked device.

In some examples, determining that the second networked device is the media receiver includes determining that one or more operational parameters are associated with the second networked device. In these examples, the one or more operational parameters may include at least one of (i) a wired network connection between the second networked device and the first networked device, (ii) a wired network connection between the second networked device and the media source device, (iii) an indication of a power connection between the second networked device and a wall power source, (iv) operating in a stationary state, and (v) a processing power above a predefined threshold.

In some examples, determining the processing power above the predefined threshold comprises determining that the second networked device has processing power available to (i) receive the media stream from the media source device, and (ii) transmit the media stream to the first networked device.

In some examples, configuring the second networked device to receive the media stream from the media source device and transmit the media stream to the first networked device further comprises configuring the second networked device to transmit the media stream to a third networked device.

In some examples, configuring the second networked device to receive the media stream from the media source device and transmit the media stream to the first networked device comprises transmitting a command to the second networked device to receive the media stream from the media source device and transmit the media stream to the first networked device. IV. Conclusion The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A non-transitory computer-readable medium, wherein the non-transitory computer-readable medium is provisioned with program instructions that, when executed by at least one processor, cause a first networked device to:
   determine that the first networked device is a bonded zone coordinator of a bonded zone comprising the first networked device and a second networked device;

based on determining that the first networked device is the bonded zone coordinator, transmit, to a media source device, a networked device identity, wherein the networked device identity references the first networked device and the second networked device;
receive a media stream from the media source device according to a first media playback protocol, wherein the first networked device is configured to use both the first media playback protocol and a second media playback protocol, wherein the first media playback protocol and the second media playback protocol are incompatible;
receive, from the second networked device, a playback command for controlling playback of the media stream according to the second media playback protocol;
execute the received playback command for controlling playback of the media stream according to the second media playback protocol;
in addition to executing the received playback command for controlling playback of the media stream according to the second media playback protocol, convert the received playback command for controlling playback of the media stream according to the second media playback protocol into a converted playback command for controlling playback of the media stream according to the first media playback protocol; and
send the converted playback command to the media source device.

2. The non-transitory computer-readable medium of claim 1, wherein the non-transitory computer-readable medium is also provisioned with program instructions that, when executed by at least one processor, cause the first networked device to:
receive metadata including information about the media stream from the media source device according to the first media playback protocol.

3. The non-transitory computer-readable medium of claim 2, wherein the non-transitory computer-readable medium is also provisioned with program instructions that, when executed by at least one processor, cause the first networked device to:
send the metadata to a control device according to the second media playback protocol, wherein the control device is configured to display an indication of the playback of the media stream by the first networked device based on the metadata.

4. The non-transitory computer-readable medium of claim 1, wherein the program instructions that, when executed by at least one processor, cause the first networked device to receive the media stream comprise program instructions that, when executed by at least one processor, cause the first networked device to:
receive a first media stream for playback in synchrony with a second media stream received by the second networked device from the media source device according to the first media playback protocol.

5. The non-transitory computer-readable medium of claim 1, wherein the program instructions that, when executed by at least one processor, cause the first networked device to determine that the first networked device is the bonded zone coordinator comprise program instructions that, when executed by at least one processor, cause the first networked device to:
compare a first device identifier of the first networked device with a second device identifier of the second networked device.

6. The non-transitory computer-readable medium of claim 1, wherein the non-transitory computer-readable medium is also provisioned with program instructions that, when executed by at least one processor, cause the first networked device to:
receive, from a control device configured to control media playback by the first and second networked devices, a second playback command for controlling playback of the media stream according to the second media playback protocol;
execute the received second playback command for controlling playback of the media stream according to the second media playback protocol;
convert the received second playback command for controlling playback of the media stream according to the second media playback protocol into a second converted playback command for controlling playback of the media stream according to the first media playback protocol; and
send the second converted playback command to the media source device.

7. The non-transitory computer-readable medium of claim 6, wherein the non-transitory computer-readable medium is also provisioned with program instructions that, when executed by at least one processor, cause the first networked device to:
send, to the second networked device, the second playback command for controlling playback of the media stream according to the second media playback protocol.

8. A first networked device comprising:
at least one processor;
non-transitory computer-readable medium; and
program instructions stored on the non-transitory computer-readable medium that are executable by the at least one processor such that the first networked device is configured to:
determine that the first networked device is a bonded zone coordinator of a bonded zone comprising the first networked device and a second networked device;
based on determining that the first networked device is the bonded zone coordinator, transmit, to a media source device, a networked device identity, wherein the networked device identity references the first networked device and the second networked device;
receive a media stream from the media source device according to a first media playback protocol, wherein the first networked device is configured to use both the first media playback protocol and a second media playback protocol, wherein the first media playback protocol and the second media playback protocol are incompatible;
receive, from the second networked device, a playback command for controlling playback of the media stream according to the second media playback protocol;
execute the received playback command for controlling playback of the media stream according to the second media playback protocol;
in addition to executing the received playback command for controlling playback of the media stream according to the second media playback protocol, convert the received playback command for controlling playback of the media stream according to the second media playback protocol into a converted playback command for controlling playback of the media stream according to the first media playback protocol; and send the converted playback command to the media source device.

9. The first networked device of claim 8, further comprising program instructions stored on the non-transitory computer-readable medium that are executable by the at least one processor such that the first networked device is configured to:

receive metadata including information about the media stream from the media source device according to the first media playback protocol.

10. The first networked device of claim 9, further comprising program instructions stored on the non-transitory computer-readable medium that are executable by the at least one processor such that the first networked device is configured to:

send the metadata to a control device according to the second media playback protocol, wherein the control device is configured to display an indication of the playback of the media stream by the first networked device based on the metadata.

11. The first networked device of claim 8, wherein the program instructions that are executable by the at least one processor such that the first networked device is configured to receive the media stream comprise program instructions that are executable by the at least one processor such that the first networked device is configured to:

receive a first media stream for playback in synchrony with a second media stream received by the second networked device from the media source device according to the first media playback protocol.

12. The first networked device of claim 8, wherein the program instructions that are executable by the at least one processor such that the first networked device is configured to determine that the first networked device is the bonded zone coordinator comprise program instructions that are executable by the at least one processor such that the first networked device is configured to:

compare a first device identifier of the first networked device with a second device identifier of the second networked device.

13. The first networked device of claim 8, further comprising program instructions stored on the non-transitory computer-readable medium that are executable by the at least one processor such that the first networked device is configured to:

receive, from a control device configured to control media playback by the first and second networked devices, a second playback command for controlling playback of the media stream according to the second media playback protocol;

execute the received second playback command for controlling playback of the media stream according to the second media playback protocol;

convert the received second playback command for controlling playback of the media stream according to the second media playback protocol into a second converted playback command for controlling playback of the media stream according to the first media playback protocol; and send the second converted playback command to the media source device.

14. The first networked device of claim 13, further comprising program instructions stored on the non-transitory computer-readable medium that are executable by the at least one processor such that the first networked device is configured to:

send, to the second networked device, the second playback command for controlling playback of the media stream according to the second media playback protocol.

15. A method carried out by a first networked device, the method comprising:

determining that the first networked device is a bonded zone coordinator of a bonded zone comprising the first networked device and a second networked device;

based on determining that the first networked device is the bonded zone coordinator, transmitting, to a media source device, a networked device identity, wherein the networked device identity references the first networked device and the second networked device;

receiving a media stream from the media source device according to a first media playback protocol, wherein the first networked device is configured to use both the first media playback protocol and a second media playback protocol, wherein the first media playback protocol and the second media playback protocol are incompatible;

receiving, from the second networked device, a playback command for controlling playback of the media stream according to the second media playback protocol;

executing the received playback command for controlling playback of the media stream according to the second media playback protocol;

in addition to executing the received playback command for controlling playback of the media stream according to the second media playback protocol, converting the received playback command for controlling playback of the media stream according to the second media playback protocol into a converted playback command for controlling playback of the media stream according to the first media playback protocol; and sending the converted playback command to the media source device.

16. The method of claim 15, further comprising:

receiving metadata including information about the media stream from the media source device according to the first media playback protocol.

17. The method of claim 16, further comprising:

sending the metadata to a control device according to the second media playback protocol, wherein the control device is configured to display an indication of the playback of the media stream by the first networked device based on the metadata.

18. The method of claim 15, wherein receiving the media stream comprises:

receiving a first media stream for playback in synchrony with a second media stream received by the second networked device from the media source device according to the first media playback protocol.

19. The method of claim 15, wherein determining that the first networked device is the bonded zone coordinator comprises:

comparing a first device identifier of the first networked device with a second device identifier of the second networked device.

20. The method of claim 15, further comprising:

receiving, from a control device configured to control media playback by the first and second networked devices, a second playback command for controlling playback of the media stream according to the second media playback protocol;
executing the second playback command for controlling playback of the media stream according to the second media playback protocol;
sending, to the second networked device, the second playback command for controlling playback of the media stream according to the second media playback protocol;
converting the second playback command for controlling playback of the media stream according to the second media playback protocol into a second converted playback command for controlling playback of the media stream according to the first media playback protocol; and
sending the second converted playback command to the media source device.

* * * * *